US009343984B2

(12) United States Patent
Tsou et al.

(10) Patent No.: US 9,343,984 B2
(45) Date of Patent: May 17, 2016

(54) CONTROLLER OF A POWER CONVERTER WITH ADJUSTABLE JITTER AMPLITUDE AND METHOD OF GENERATING ADJUSTABLE JITTER AMPLITUDE THEREOF

(71) Applicant: Leadtrend Technology Corp., Hsin-Chu (TW)

(72) Inventors: Ming-Chang Tsou, Hsin-Chu (TW); Jiun-Sheng Huang, Hsin-Chu (TW); Kuo-Chien Huang, Hsin-Chu (TW); Ren-Yi Chen, Hsin-Chu (TW)

(73) Assignee: Leadtrend Technology Corp., Zhubei, Hsinchu County (TW)

( * ) Notice: Subject to any disclaimer, the term of this patent is extended or adjusted under 35 U.S.C. 154(b) by 148 days.

(21) Appl. No.: 14/185,923

(22) Filed: Feb. 21, 2014

(65) Prior Publication Data

US 2014/0233268 A1 Aug. 21, 2014

(30) Foreign Application Priority Data

Feb. 21, 2013 (TW) ............................... 102106097 A

(51) Int. Cl.
| | |
|---|---|
| *H02M 3/335* | (2006.01) |
| *H02M 1/32* | (2007.01) |
| *H02M 1/00* | (2006.01) |
| *H05B 33/08* | (2006.01) |

(52) U.S. Cl.
CPC ...... *H02M 3/33523* (2013.01); *H02M 3/33515* (2013.01); *H02M 1/32* (2013.01); *H02M 2001/0009* (2013.01); *H05B 33/0815* (2013.01); *Y02B 70/1433* (2013.01)

(58) Field of Classification Search
CPC ............ H02M 3/335; H02M 3/33507; H02M 3/33515; H02M 3/33523; H02M 3/33538; H02M 3/33546; H02M 3/33553

USPC .......... 363/21.04, 21.05, 21.07, 21.08, 21.09, 363/21.12, 21.13, 21.15, 21.16, 21.17
See application file for complete search history.

(56) References Cited

U.S. PATENT DOCUMENTS

| | | | |
|---|---|---|---|
| 7,026,851 B2 | 4/2006 | Yang | |
| 2011/0122660 A1* | 5/2011 | Cacciotto | H02M 3/33515 363/21.18 |
| 2011/0267843 A1* | 11/2011 | Djenguerian | H02M 3/33507 363/21.01 |
| 2012/0275199 A1* | 11/2012 | Li | H02M 3/33507 363/21.15 |
| 2013/0100715 A1* | 4/2013 | Lin | H02M 3/33507 363/21.17 |
| 2013/0147379 A1* | 6/2013 | Zhou | H05B 33/0815 315/210 |
| 2013/0342938 A1* | 12/2013 | Eom | H02M 1/32 361/18 |

FOREIGN PATENT DOCUMENTS

| | | |
|---|---|---|
| TW | 201218590 | 5/2012 |
| TW | 201234746 | 8/2012 |

* cited by examiner

*Primary Examiner* — Jeffrey Gblende
(74) *Attorney, Agent, or Firm* — Winston Hsu; Scott Margo

(57) ABSTRACT

A controller of a power converter with adjustable jitter amplitude includes a feedback pin, a logic circuit, an auxiliary pin, and a current sensing pin. The feedback pin is used for receiving a feedback voltage from a secondary side of the power converter. The feedback voltage corresponds to an output voltage of the secondary side of the power converter. The logic circuit is used for generating a jitter signal according to a clock, the feedback voltage, and a first resistor. The auxiliary pin is used for receiving a voltage corresponding to an auxiliary winding of the power converter. The current sensing pin is used for generating a detection voltage according to a current flowing through a primary side of the power converter. The voltage, the jitter signal, and the detection voltage determine turning-on time of the primary side of the power converter.

20 Claims, 8 Drawing Sheets

500
CONTROLLER OF A POWER CONVERTER WITH ADJUSTABLE JITTER AMPLITUDE AND METHOD OF GENERATING ADJUSTABLE JITTER AMPLITUDE THEREOF

BACKGROUND OF THE INVENTION

1. Field of the Invention

The present invention relates to a controller of a power converter with adjustable jitter amplitude and a method of generating adjustable jitter amplitude thereof, and particularly to a controller of a power converter and a method of generating adjustable jitter amplitude thereof that can utilize a logic circuit of the controller to jitter a feedback voltage of a secondary side of the power converter or a current flowing through a primary side of the power converter to adjust turning-on time of a power switch of the power converter.

2. Description of the Prior Art

Currently, most consumer electronic devices adopt switching power supplies as power supplies, where the switching power supply can control an inductor included thereof to store/release power by switching a power switch included thereof to provide power matching specification requirements. If switching of the power switch is always maintained at specific frequency, an electromagnetic wave with the specific frequency can be easily radiated through connections among the consumer electronic devices, resulting in the consumer electronic devices suffering electromagnetic interference.

The prior art makes a switching frequency of the power switch jitter around the specific frequency (that is, frequency jittering) to solve the electromagnetic interference. The frequency jittering mainly jitters a fundamental frequency and a second harmonic of the power switch to execute power dispersion in a frequency domain to reduce peak power of the electromagnetic interference.

In a quasi resonant pulse width modulation mode, the quasi resonant pulse width modulation mode can naturally jitter between a first trough and a second trough to generate a jitter-like phenomenon. But, the jitter-like phenomenon can not significantly reduce the electromagnetic interference. In addition, when the quasi resonant pulse width modulation mode has a low voltage and heavy load, peak power of the electromagnetic interference is very large. For example, when a pulse width modulation frequency is between 150 KHz and 1 MHz, the peak power of the electromagnetic interference is very large.

SUMMARY OF THE INVENTION

An embodiment provides a controller of a power converter with adjustable jitter amplitude. The controller includes a feedback pin, a logic circuit, an auxiliary pin, and a current sensing pin. The feedback pin is used receiving a feedback voltage from a secondary side of the power converter, where the feedback voltage corresponds to an output voltage of the secondary side of the power converter. The logic circuit is used for generating a jitter signal according to a clock, the feedback voltage, and a first resistor. The auxiliary pin is used for receiving a voltage corresponding to an auxiliary winding of the power converter. The current sensing pin is used for generating a detection voltage according to a current flowing through a primary side of the power converter. The voltage, the jitter signal, and the detection voltage are used for determining turning-on time of the primary side of the power converter.

Another embodiment provides a controller of a power converter with adjustable jitter amplitude. The controller includes a feedback pin, a logic circuit, an auxiliary pin, and a current sensing pin. The feedback pin is used for receiving a feedback voltage from a secondary side of the power converter, where the feedback voltage corresponds to an output voltage of the secondary side of the power converter. The first logic unit is used for generating an adjustable current according to a clock and a current flowing through a primary side of the power converter. The auxiliary pin is used for receiving a voltage corresponding to an auxiliary winding of the power converter. The current sensing pin is used for generating a detection voltage according to the adjustable current. The voltage, the feedback voltage, and the detection voltage are used for determining turning-on time of the primary side of the power converter.

Another embodiment provides a method of a controller of a power converter generating adjustable jitter amplitude, where the controller includes a feedback pin, a logic circuit, a current sensing pin, and an auxiliary pin, and the logic circuit includes a first logic unit and a second logic unit. The method includes the feedback pin receiving a feedback voltage from a secondary side of the power converter, where the feedback voltage corresponds to an output voltage of the secondary side of the power converter; the logic circuit generating a predetermined-bit digital signal according to a clock; the auxiliary pin receiving a voltage corresponding to an auxiliary winding of the power converter; the current sensing pin generating a detection voltage according to a current flowing through a primary side of the power converter; and determining turning-on time of the primary side of the power converter according to the voltage, the predetermined-bit digital signal, and the detection voltage.

The present invention provides a controller of a power converter with adjustable jitter amplitude and a method of generating adjustable jitter amplitude thereof. The controller and the method utilize a logic circuit of the controller to jitter a feedback voltage of a secondary side of the power converter or a current flowing through a primary side of the power converter to make turning-on time of a power switch of the primary side of the power converter be not fixed. Thus, compared to the prior art, the present invention can jitter a fundamental frequency and a second harmonic of the power switch to execute power dispersion in a frequency domain to reduce peak power of electromagnetic interference of the power converter in a quasi resonant pulse width modulation mode.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
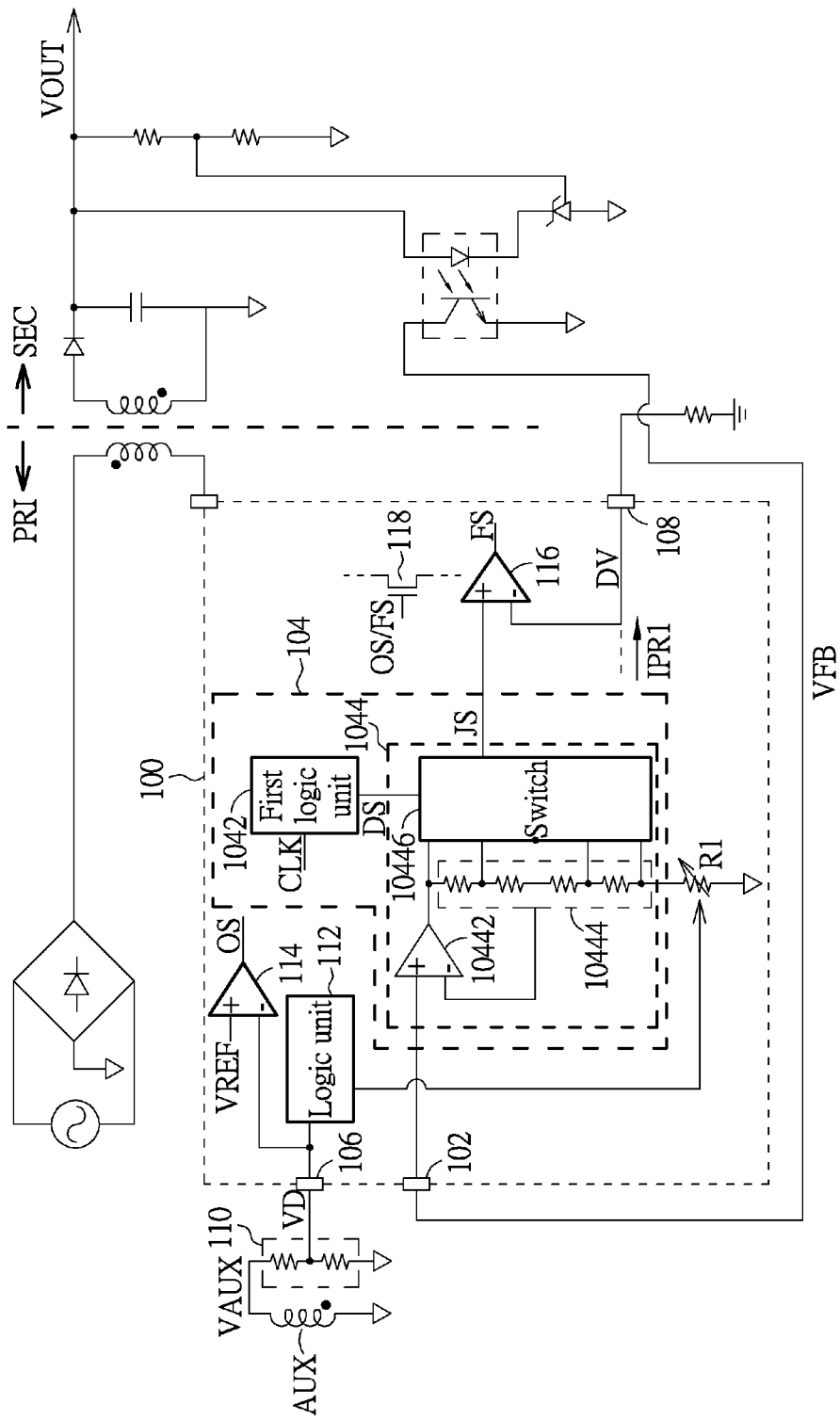
FIG. 1 is a diagram illustrating a controller of a power converter with adjustable jitter amplitude according to an embodiment.

Please refer to FIG. 1. FIG. 1 is a diagram illustrating a controller 100 of a power converter with adjustable jitter amplitude according to an embodiment. As shown in FIG. 1, the controller 100 includes a feedback pin 102, a logic circuit 104, an auxiliary pin 106, and a current sensing pin 108. The feedback pin 102 is used for receiving a feedback voltage VFB from a secondary side SEC of the power converter, where the feedback voltage VFB corresponds to an output voltage VOUT of the secondary side SEC of the power converter, and is a direct current voltage. The logic circuit 104 is used for generating a jitter signal JS according to a clock CLK, the feedback voltage VFB, and a first resistor R1, where the clock CLK is an inner clock within the controller 100. The auxiliary pin 106 is used for receiving a voltage VD corresponding to an auxiliary winding AUX of the power converter, where the voltage VD is generated by a voltage divider 110 coupled to the auxiliary winding AUX, the voltage VD can set the first resistor R1 through a logic unit 112, and the voltage VD corresponds to a voltage VAUX of the auxiliary winding AUX. The current sensing pin 108 is used for generating a detection voltage DV according to a current IPRI flowing through a primary side PRI of the power converter. The voltage VD, the jitter signal JS, and the detection voltage DV are used for determining turning-on time of the primary side PRI of the power converter.

As shown in FIG. 1, the logic circuit 104 includes a first logic unit 1042 and a second logic unit 1044. The first logic unit 1042 is used for generating a predetermined-bit digital signal DS (e.g. a 4-bit digital signal) according to the clock CLK, where the predetermined-bit digital signal DS is periodically first gradually increased and then gradually decreased, or periodically first gradually decreased and then gradually increased during a period of the clock CLK. But, the present invention is not limited to the predetermined-bit digital signal DS being a 4-bit digital signal. The second logic unit 1044 includes an amplifier 10442, a variable resistor 10444, and a switch 10446. The amplifier 10442 has a first input terminal for receiving the feedback voltage VFB, and a second input terminal; the variable resistor 10444 is coupled to the second input terminal of the amplifier 10442 and the switch 10446. Therefore, as shown in FIG. 1, the switch 10446 can switch inner switches of the switch 10446 to adjust a resistance of the variable resistor 10444 according to the predetermined-bit digital signal DS. In addition, the variable resistor 10444 is not limited to including 4 series resistors.

Because the predetermined-bit digital signal DS is periodically first gradually increased and then gradually decreased, or first gradually decreased and then gradually increased during a period of the clock CLK, the switch 10446 can gradually adjust the variable resistor 10444 from a large resistance to a small resistance or from a small resistance to a large resistance according to the predetermined-bit digital signal DS. Thus, the second logic unit 1044 can generate the jitter signal JS according to the feedback voltage VFB, the resistance of the variable resistor 10444, the first resistor R1, and equation (1):

$$JS = VFB \pm VFB \times \frac{R}{R1 + R} \quad (1)$$

Figure 2:
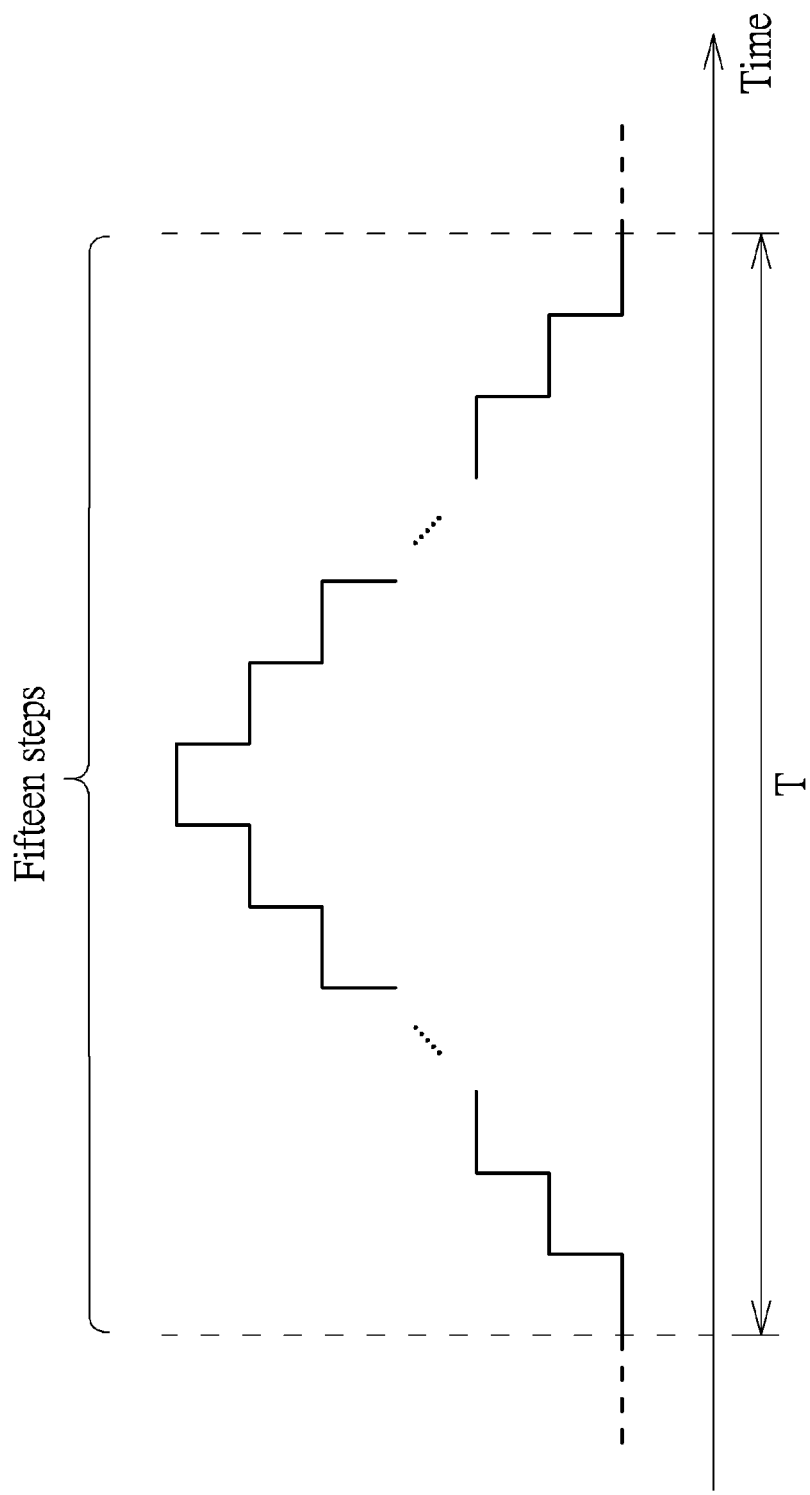
FIG. 2 is a diagram illustrating the jitter signal.

In equation (1), R is the resistance of the variable resistor 10444. As shown in equation (1), the first resistor R1 can control maximum amplitude of jitter signal JS (e.g. the maximum amplitude of jitter signal JS is equal to the ±4% jitter signal JS), and the jitter signal JS can be periodically gradually changed from high to low or from low to high according to the resistance of the variable resistor 10444 and the predetermined-bit digital signal DS. Please refer to FIG. 2. FIG. 2 is a diagram illustrating the jitter signal JS. As shown in FIG. 2, because the predetermined-bit digital signal DS is a 4-bit digital signal, the jitter signal JS is gradually changed from high to low or from low to high by a fifteen steps mode within the maximum amplitude of jitter signal JS during a period T of the predetermined-bit digital signal DS.

As shown in FIG. 1, the controller 100 further includes a first comparator 114 and a second comparator 116. The first comparator 114 is used for generating and outputting a turning-on signal OS to a power switch 118 of the primary side PRI of the power converter according to the voltage VD and a reference voltage VREF, where the power switch 118 is integrated into the controller 100. The second comparator 116 is used for generating and outputting a turning-off signal FS to the power switch 118 according to the jitter signal JS and the detection voltage DV.

Figure 3:
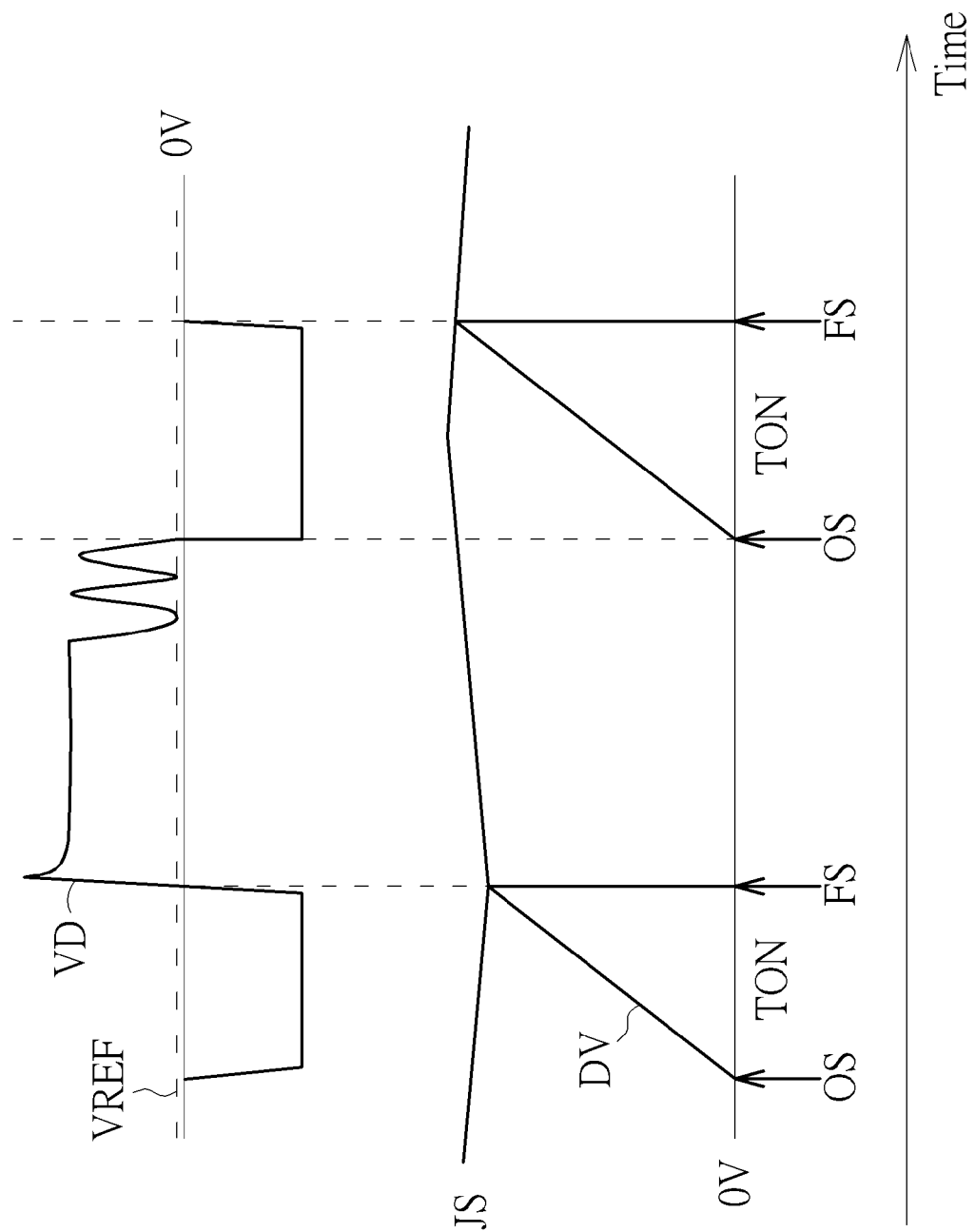
FIG. 3 is a diagram illustrating the reference voltage, the jitter signal, the voltage, the detection voltage, and turning-on time of the primary side of the power converter.

Please refer to FIG. 3. FIG. 3 is a diagram illustrating the reference voltage VREF, the jitter signal JS, the voltage VD, the detection voltage DV, and turning-on time TON (turning-on time of the power switch 118) of the primary side PRI of the power converter. As shown in FIG. 3, when the voltage VD is decreased (because the voltage VAUX is decreased) due to turning-off of the power switch 118 to be lower than the reference voltage VREF, the first comparator 114 can generate the turning-on signal OS to the power switch 118 of the primary side PRI of the power converter, resulting in the power switch 118 being turned on. In addition, when the detection voltage DV is higher than the jitter signal JS, the second comparator 116 can generate the turning-off signal FS to the power switch 118. Therefore, the turning-on signal OS and the turning-off signal FS can determine the turning-on time TON of the primary side PRI of the power converter. However, because the jitter signal JS is periodically gradually changed from high to low or from low to high during the period T of the predetermined-bit digital signal DS, the turning-on time TON is also changed with the jitter signal JS, that is, the turning-on time TON is not fixed.

Figure 4:
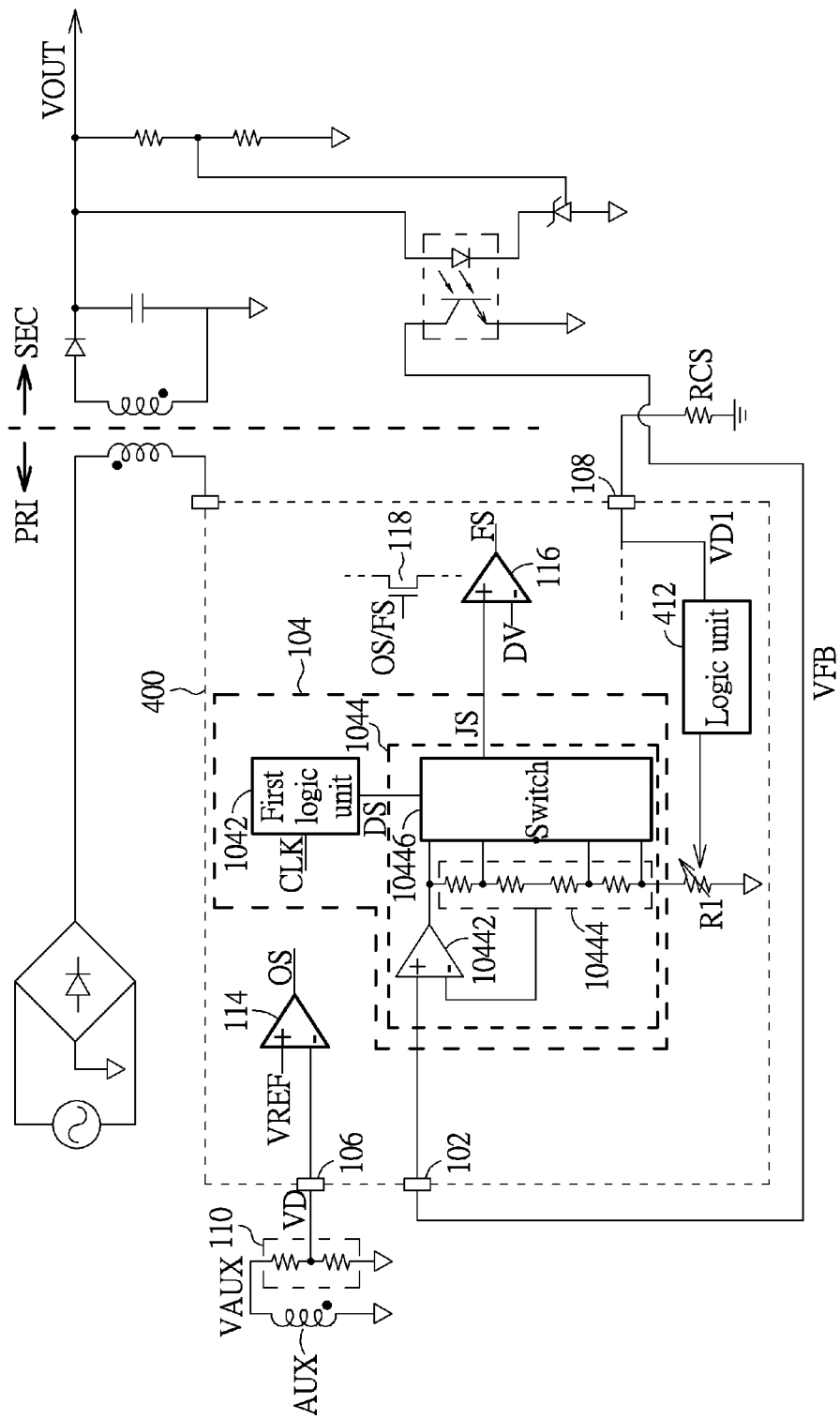
FIG. 4 is a diagram illustrating a controller of a power converter with adjustable jitter amplitude according to another embodiment.

Please refer to FIG. 4. FIG. 4 is a diagram illustrating a controller 400 of a power converter with adjustable jitter amplitude according to another embodiment. A difference between the controller 400 and the controller 100 is that the controller 400 utilizes a voltage VD1 generated by a resistor RCS coupled to the current sensing pin 108 during turning-off of the power switch 118 to set the first resistor R1 through a logic unit 412. In addition, subsequent operational principles of the controller 400 are the same as those of the controller 100, so further description thereof is omitted for simplicity.

Figure 5:
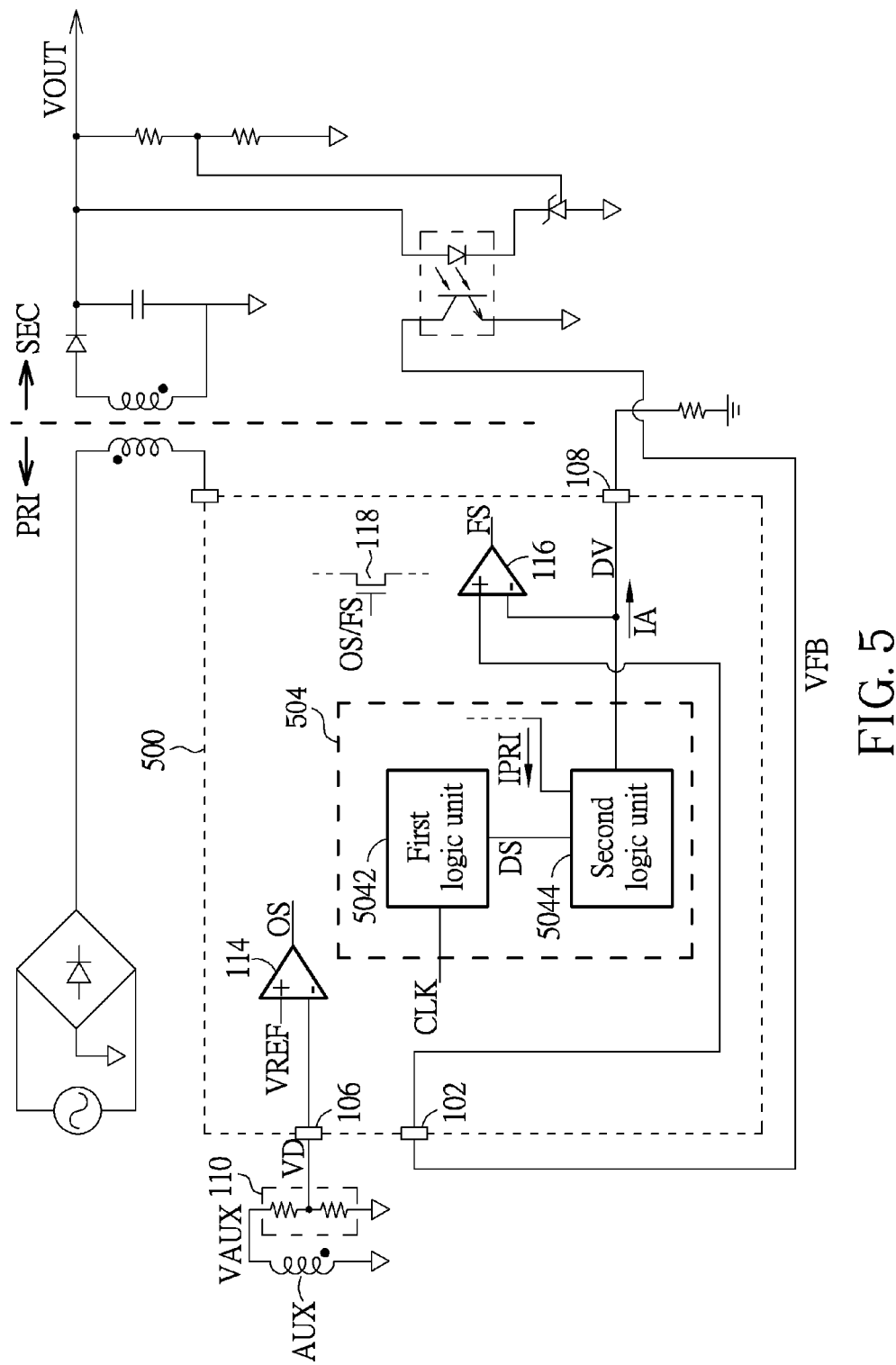
FIG. 5 is a diagram illustrating a controller of a power converter with adjustable jitter amplitude according to another embodiment.

Please refer to FIG. 5. FIG. 5 is a diagram illustrating a controller 500 of a power converter with adjustable jitter amplitude according to another embodiment. A difference between the controller 500 and the controller 100 is that a logic circuit 504 of the controller 500 is used for generating an adjustable current IA according to a clock CLK and a current IPRI flowing through the primary side PRI of the power converter. The current sensing pin 108 is used for generating a detection voltage DV according to the adjustable current IA.

As shown in FIG. 5, the logic circuit 504 includes a first logic unit 5042 and a second logic unit 5044. The first logic unit 5042 is used for generating a predetermined-bit digital signal DS (e.g. a 4-bit digital signal) according to the clock CLK, where the predetermined-bit digital signal DS is periodically first gradually increased and then gradually decreased, or first gradually decreased and then gradually increased during a period of the clock CLK. But, the present invention is not limited to the predetermined-bit digital signal DS being a 4-bit digital signal. The second logic unit 5044 is used for generating the adjustable current IA according to the predetermined-bit digital signal DS and the current IPRI flowing through the primary side PRI of the power converter.

Figure 6:
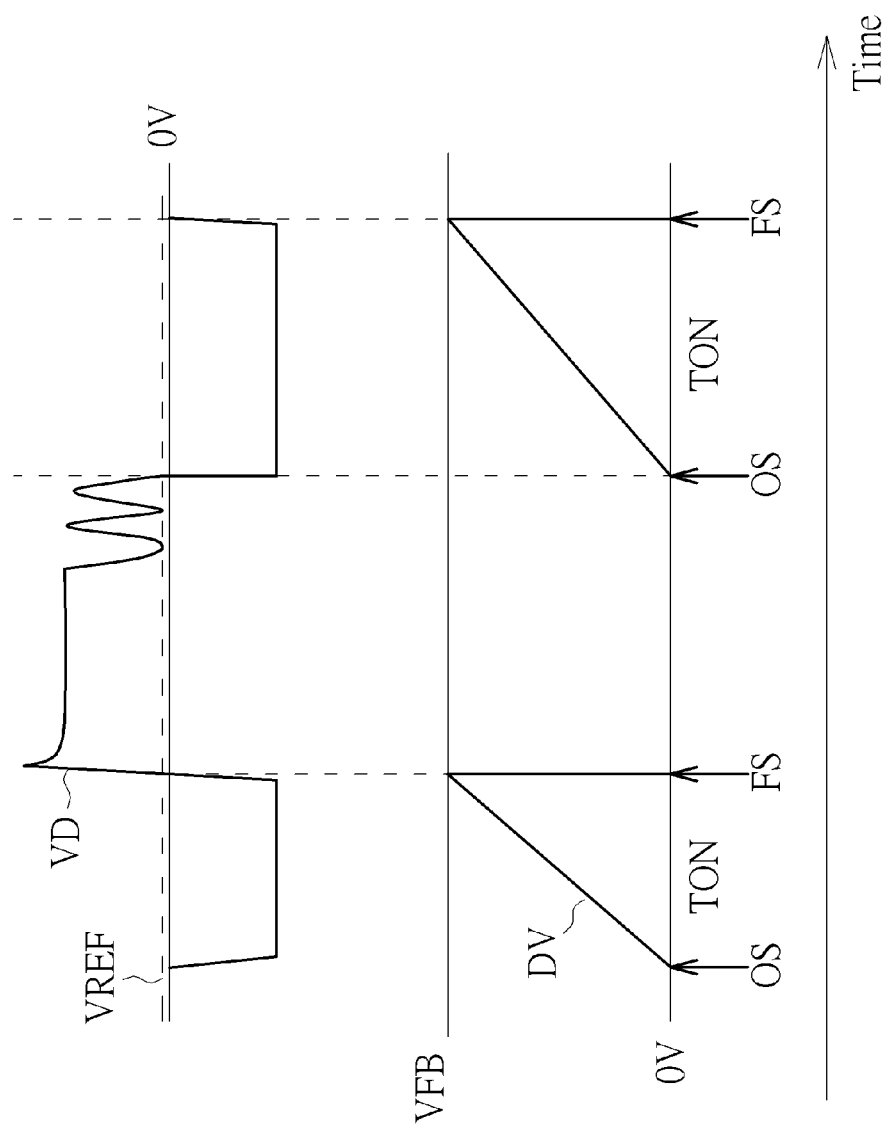
FIG. 6 is a diagram illustrating the reference voltage, the voltage, the feedback voltage, the detection voltage and turning-on time of the primary side of the power converter.

Please refer to FIG. 6. FIG. 6 is a diagram illustrating the reference voltage VREF, the voltage VD, the feedback voltage VFB, the detection voltage DV and turning-on time TON (that is, turning-on time of the power switch 118) of the primary side PRI of the power converter. Because the second logic unit 5044 periodically first gradually increases and then gradually decreases the current IPRI to generate the adjustable current IA, or periodically first gradually decreases and then gradually increases the current IPRI to generate the adjustable current IA according to the predetermined-bit digital signal DS during a period of the clock CLK, and the current sensing pin 108 generates the detection voltage DV according to the adjustable current IA, the detection voltage DV is also periodically changed during a period T of the predetermined-bit digital signal DS. As shown in FIG. 6, when the voltage VD is decreased (because the voltage VAUX is decreased) due to turning-off of the power switch 118 to be lower than the reference voltage VREF, the first comparator 114 can generate a turning-on signal OS to the power switch 118 of the primary side PRI of the power converter, resulting in the power switch 118 being turned on. In addition, when the detection voltage DV is higher than the feedback voltage VFB, the second comparator 116 can generate a turning-off signal FS to the power switch 118. Therefore, the turning-on signal OS and the turning-off signal FS can determine the turning-on time TON of the primary side PRI of the power converter. However, because the detection voltage DV is periodically gradually changed from high to low or from low to high during a period T of the predetermined-bit digital signal DS, the turning-on time TON is also changed with the detection voltage DV, that is, the turning-on time TON is not fixed.

Figure 7:
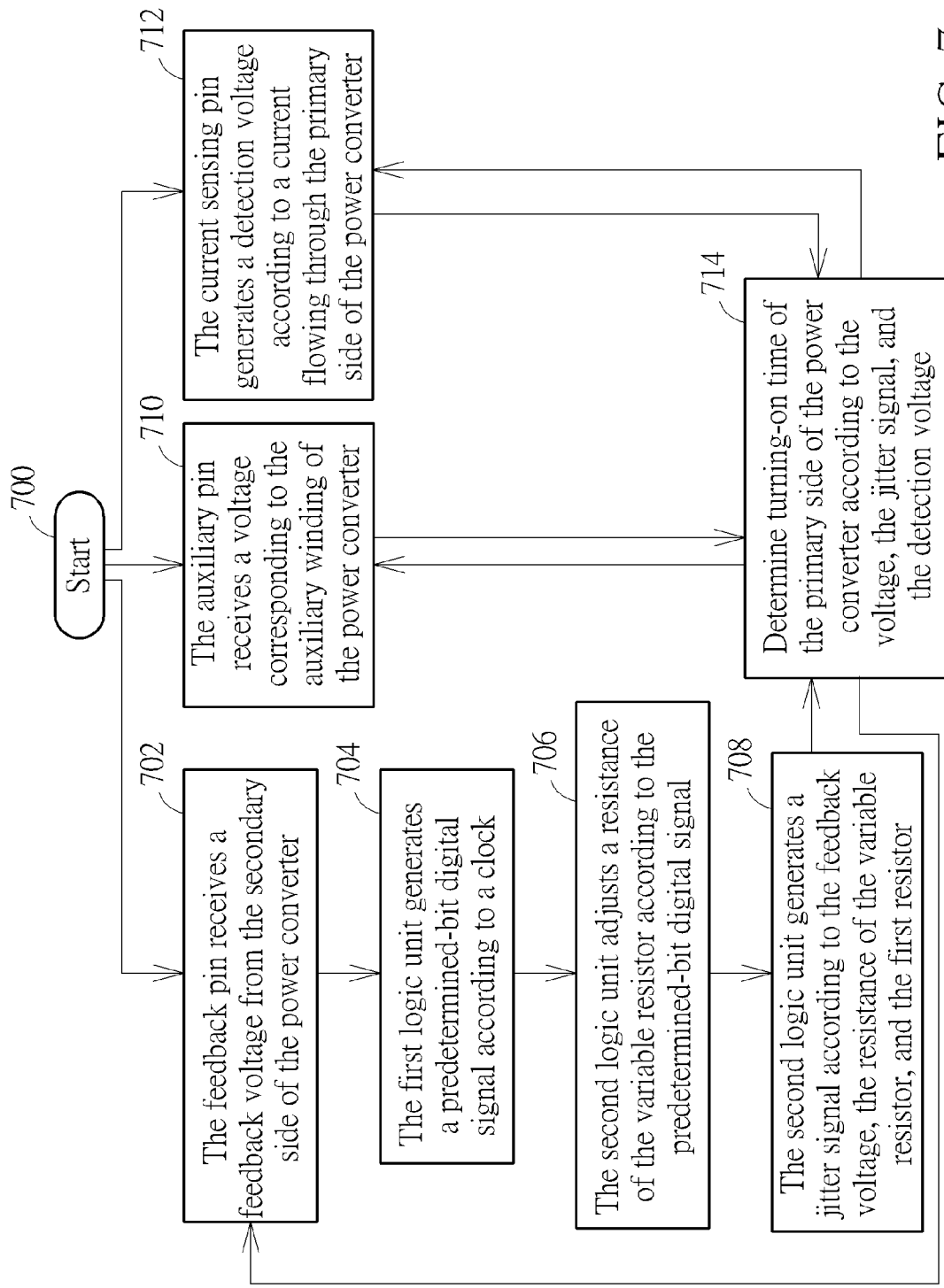
FIG. 7 is a flowchart illustrating a method of a controller of a power converter generating adjustable jitter amplitude according to another embodiment.

Please refer to FIG. 1, FIG. 2, FIG. 3, FIG. 4, and FIG. 7. FIG. 7 is a flowchart illustrating a method of a controller of a power converter generating adjustable jitter amplitude according to another embodiment. The method in FIG. 7 is illustrated using the controller 100 in FIG. 1. Detailed steps are as follows:

Step 700: Start.

Step 702: The feedback pin 102 receives a feedback voltage VFB from the secondary side SEC of the power converter.

Step 704: The first logic unit 1042 generates a predetermined-bit digital signal DS according to a clock CLK.

Step 706: The second logic unit 1044 adjusts a resistance of the variable resistor 10444 according to the predetermined-bit digital signal DS.

Step 708: The second logic unit 1044 generates a j fitter signal JS according to the feedback voltage VFB, the resistance of the variable resistor 10444, and the first resistor R1, go to Step 714.

Step 710: The auxiliary pin 106 receives a voltage VD corresponding to the auxiliary winding AUX of the power converter, go to Step 714.

Step 712: The current sensing pin 108 generates a detection voltage DV according to a current IPRI flowing through the primary side PRI of the power converter.

Step 714: Determine turning-on time TON of the primary side PRI of the power converter according to the voltage VD, the jitter signal JS, and the detection voltage DV, go to Step 702, Step 710, and Step 712.

In Step 702, the feedback voltage VFB corresponds to an output voltage VOUT of the secondary side SEC of the power converter, and is a direct current voltage. In Step 704, the first logic unit 104 is used for generating the predetermined-bit digital signal DS (e.g. a 4-bit digital signal) according to the clock CLK, where the predetermined-bit digital signal DS is periodically first gradually increased and then gradually decreased, or first gradually decreased and then gradually increased during a period of the clock CLK. But, the present invention is not limited to the predetermined-bit digital signal DS being a 4-bit digital signal. In addition, the clock CLK is an inner clock within the controller 100. In Step 706, the switch 10446 can switch inner switches of the switch 10446 to adjust the resistance of the variable resistor 10444 according to the predetermined-bit digital signal DS. Because the predetermined-bit digital signal DS is periodically first gradually increased and then gradually decreased, or first gradually decreased and then gradually increased during a period of the clock CLK, the switch 10446 can gradually adjust the variable resistor 10444 from a large resistance to a small resistance or from a small resistance to a large resistance according to the predetermined-bit digital signal DS. Thus, in Step 708, the second logic unit 1044 can generate the jitter signal JS according to the feedback voltage VFB, the resistance of the variable resistor 10444, and the first resistor R1, where the jitter signal JS is gradually changed from high to low or from low to high by a fifteen steps mode within the maximum amplitude of jitter signal JS (as shown in FIG. 2) during a period T of the predetermined-bit digital signal DS. In Step 710, the voltage VD is generated by the voltage divider 110 coupled to the auxiliary winding AUX, and the voltage VD can set the first resistor R1 through the logic unit 112 (as shown in FIG. 1). But, in another embodiment of the present invention, the controller 400 utilizes a voltage VD1 generated by the resistor RCS coupled to the current sensing pin 108 during turning-off of the power switch 118 to set the first resistor R1 through the logic unit 412 (as shown in FIG. 4). In Step 714, as shown in FIG. 1 and FIG. 3, the first comparator 114 of the controller 100 can generate and output a turning-on signal OS to the power switch 118 of the primary side PRI of the power converter according to the voltage VD and a reference voltage VREF, where the power switch 118 is integrated into the controller 100. The second comparator 116 of the controller 100 can generate and output a turning-off signal FS to the power switch 118 according to the jitter signal JS and the detection voltage DV. Therefore, the controller 100 can determine the turning-on time TON the primary side PRI of the power converter through the turning-on signal OS and the turning-off signal FS. However, because the jitter signal JS is periodically gradually changed from high to low or from low to high during the period T of the predetermined-bit digital signal DS, the turning-on time TON is also changed with the jitter signal JS, that is, the turning-on time TON is not fixed.

Figure 8:
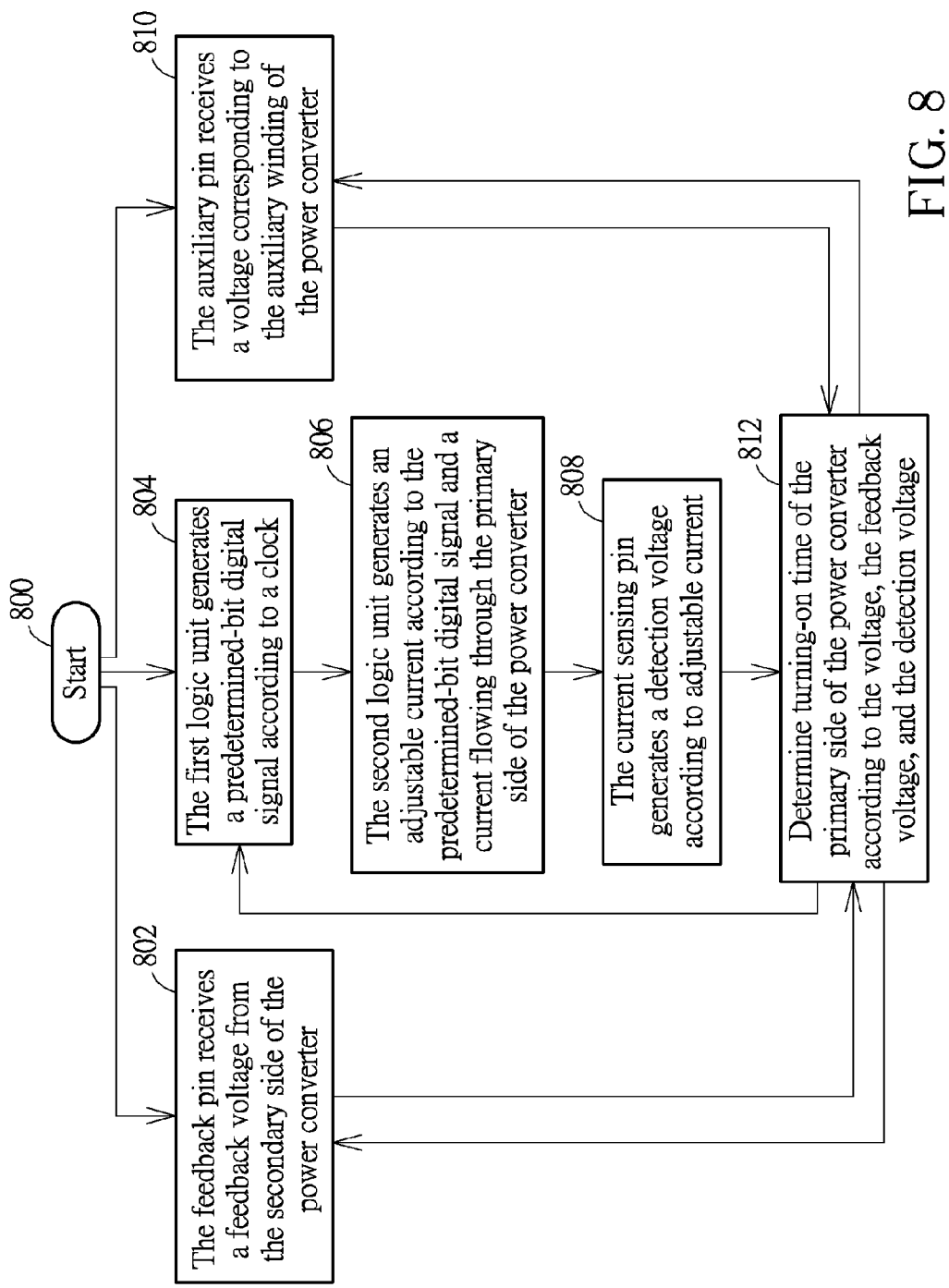
FIG. 8 is a flowchart illustrating a method of a controller of a power converter generating adjustable jitter amplitude according to another embodiment.

Please refer to FIG. 5, FIG. 6, and FIG. 8. FIG. 8 is a flowchart illustrating a method of a controller of a power converter generating adjustable jitter amplitude according to another embodiment. The method in FIG. 8 is illustrated using the controller 500 in FIG. 5. Detailed steps are as follows:

Step 800: Start.

Step 802: The feedback pin 102 receives a feedback voltage VFB from the secondary side SEC of the power converter, go to Step 812.

Step 804: The first logic unit 5042 generates a predetermined-bit digital signal DS according to a clock CLK.

Step 806: The second logic unit 5044 generates an adjustable current IA according to the predetermined-bit digital signal DS and a current IPRI flowing through the primary side PRI of the power converter.

Step 808: The current sensing pin 108 generates a detection voltage DV according to adjustable current IA, go to Step 812.

Step 810: The auxiliary pin 106 receives a voltage VD corresponding to the auxiliary winding AUX of the power converter.

Step 812: Determine turning-on time TON of the primary side PRI of the power converter according to the voltage VD, the feedback voltage VFB, and the detection voltage DV, go to Step 802, Step 804, and Step 810.

A difference between the embodiment in FIG. 8 and the embodiment in FIG. 7 is that in Step 806, the second logic unit 5044 generates the adjustable current IA according to the predetermined-bit digital signal DS and the current IPRI flowing through the primary side PRI of the power converter; and in Step 810, the current sensing pin 108 generates the detection voltage DV according to the adjustable current IA. Therefore, in Step 812, as shown in FIG. 5 and FIG. 6, first the comparator 114 of the controller 500 can generate and output a turning-on signal OS to the power switch 118 of the primary side PRI of the power converter according to the voltage VD and a reference voltage VREF; and in addition, the second comparator 116 of the controller 500 can generate and output a turning-off signal FS to the power switch 118 according to the detection voltage DV and the feedback voltage VFB. Therefore, the controller 500 can determine the turning-on time TON of the primary side PRI of the power converter through the turning-on signal OS and the turning-off signal FS. However, because the detection voltage DV is periodically gradually changed from high to low or from low to high during the period T of the predetermined-bit digital signal DS, the turning-on time TON is also changed with the detection voltage DV, that is, the turning-on time TON is not fixed.

To sum up, the controller of the power converter with adjustable jitter amplitude and the method of the controller of the power converter generating adjustable jitter amplitude utilize the logic circuit of the controller to jitter a feedback voltage of the secondary side of the power converter or a current flowing through the primary side of the power converter to make turning-on time of the power switch of the primary side of the power converter be not fixed. Thus, compared to the prior art, the present invention can jitter a fundamental frequency and a second harmonic of the power switch to execute power dispersion in a frequency domain to reduce peak power of electromagnetic interference of the power converter in a quasi resonant pulse width modulation mode.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A controller of a power converter with adjustable jitter amplitude, the controller comprising:
   a feedback pin for receiving a feedback voltage from a secondary side of the power converter, wherein the feedback voltage corresponds to an output voltage of the secondary side of the power converter;
   a logic circuit comprising:
      a first logic unit for generating a predetermined-bit digital signal according to a clock; and
      a second logic unit for generating a jitter signal according to the feedback voltage, the predetermined-bit digital signal, and a first resistor;
   an auxiliary pin for receiving a voltage corresponding to an auxiliary winding of the power converter; and
   a current sensing pin for generating a detection voltage according to a current flowing through a primary side of the power converter;
   wherein the voltage, the jitter signal, and the detection voltage are used for determining turning-on time of the primary side of the power converter.

2. The controller of claim 1, wherein the predetermined-bit digital signal is first gradually increased and then gradually decreased, or first gradually decreased and then gradually increased during a period of the clock.

3. The controller of claim 1, wherein the second logic unit comprises:
   an amplifier having a first input terminal for receiving the feedback voltage, and a second input terminal;
   a variable resistor coupled to the second input terminal of the amplifier; and
   a switch for adjusting a resistance of the variable resistor according to the predetermined-bit digital signal.

4. The controller of claim 3, wherein the second logic unit generating the jitter signal according to the feedback voltage, the predetermined-bit digital signal, and the first resistor is the second logic unit generating the jitter signal according to the feedback voltage, the resistance of the variable resistor, and the first resistor.

5. The controller of claim 1, wherein the first resistor is set by a voltage divider coupled to the auxiliary winding.

6. The controller of claim 1, wherein the first resistor is set by a resistor coupled to the current sensing pin.

7. The controller of claim 1, further comprising:
   a first comparator for generating and outputting a turning-on signal to a power switch of the primary side of the power converter according to the voltage and a reference voltage; and
   a second comparator for generating and outputting a turning-off signal to the power switch according to the jitter signal and the detection voltage.

8. The controller of claim 1, further comprising the clock.

9. A controller of a power converter with adjustable jitter amplitude, the controller comprising:
   a feedback pin for receiving a feedback voltage from a secondary side of the power converter, wherein the feedback voltage corresponds to an output voltage of the secondary side of the power converter;
   a logic circuit comprising:
      a first logic unit for generating a predetermined-bit digital signal according to a clock; and a second logic unit for generating an adjustable current according to the predetermined-bit digital signal and a current flowing through a primary side of the power converter;

an auxiliary pin for receiving a voltage corresponding to an auxiliary winding of the power converter; and a current sensing pin for generating a detection voltage according to the adjustable current;

wherein the voltage, the feedback voltage, and the detection voltage are used for determining turning-on time of the primary side of the power converter.

10. The controller of claim 9, wherein the second logic unit first gradually increases and then gradually decreases the current to generate the adjustable current, or first gradually decreases and then gradually increases the current to generate the adjustable current according to the predetermined-bit digital signal during a period of the clock.

11. The controller of claim 9, further comprising:

a first comparator for generating and outputting a turning-on signal to a power switch of the primary side of the power converter according to the voltage and a reference voltage; and a second comparator for generating and outputting a turning-off signal to the power switch according to the feedback voltage and the detection voltage.

12. The controller of claim 9, further comprising the clock.

13. A method of a controller of a power converter generating adjustable jitter amplitude, the controller comprising a feedback pin, a logic circuit, a current sensing pin, and an auxiliary pin, wherein the logic circuit comprises a first logic unit and a second logic unit, the method comprising:

the feedback pin receiving a feedback voltage from a secondary side of the power converter, wherein the feedback voltage corresponds to an output voltage of the secondary side of the power converter;

the logic circuit generating a predetermined-bit digital signal according to a clock, wherein the predetermined-bit digital signal is first gradually increased and then gradually decreased or first gradually decreased and then gradually increased during a period of the clock;

the auxiliary pin receiving a voltage corresponding to an auxiliary winding of the power converter;

the current sensing pin generating a detection voltage according to a current flowing through a primary side of the power converter;

the first logic unit generating the predetermined-bit digital signal according to the clock;

the second logic unit adjusting a resistance of a variable resistor according to the predetermined-bit digital signal;

the second logic unit generating a jitter signal according to the feedback voltage, the resistance of the variable resistor, and a first resistor; and determining turning-on time of the primary side of the power converter according to the voltage, the jitter signal, and the detection voltage.

14. The method of claim 13, wherein the first resistor is set by a voltage divider coupled to the auxiliary winding.

15. The method of claim 13, wherein the first resistor is set by a resistor coupled to the current sensing pin.

16. The method of claim 13, wherein the clock is a clock within the controller.

17. A method of a controller of a power converter generating adjustable jitter amplitude, the controller comprising a feedback pin, a logic circuit, a current sensing pin, and an auxiliary pin, wherein the logic circuit comprises a first logic unit and a second logic unit, the method comprising:

the feedback pin receiving a feedback voltage from a secondary side of the power converter, wherein the feedback voltage corresponds to an output voltage of the secondary side of the power converter;

the logic circuit generating a predetermined-bit digital signal according to a clock, wherein the predetermined-bit digital signal is first gradually increased and then gradually decreased or first gradually decreased and then gradually increased during a period of the clock;

the auxiliary pin receiving a voltage corresponding to an auxiliary winding of the power converter;

the first logic unit generating the predetermined-bit digital signal according to the clock;

the second logic unit generating an adjustable current according to the predetermined-bit digital signal and a current flowing through a primary side of the power converter;

the current sensing pin generating a detection voltage according to the adjustable current; and determining turning-on time of the primary side of the power converter according to the voltage, the predetermined-bit digital signal, and the detection voltage.

18. The method of claim 17, wherein determining the turning-on time of the primary side of the power converter according to the voltage, the predetermined-bit digital signal, and the detection voltage is determining the turning-on time of the primary side of the power converter according to the voltage, the feedback voltage, and the detection voltage.

19. The method of claim 17, wherein during a period of the clock, the second logic unit first gradually increases and then gradually decreases the current to generate the adjustable current, or first gradually decreases and then gradually increases the current to generate the adjustable current according to the predetermined-bit digital signal.

20. The method of claim 18, wherein the clock is a clock within the controller.

* * * * *